United States Patent
Brewer

(10) Patent No.: US 6,853,552 B2
(45) Date of Patent: Feb. 8, 2005

(54) EXTENDABLE COMPUTER CARTRIDGE RECEPTACLE SYSTEM

(75) Inventor: James A. Brewer, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 126 days.

(21) Appl. No.: 10/226,938

(22) Filed: Aug. 23, 2002

(65) Prior Publication Data

US 2004/0037033 A1 Feb. 26, 2004

(51) Int. Cl.[7] ............................. G06F 1/20; G06F 1/16
(52) U.S. Cl. ...................... 361/687; 361/724; 248/634; 312/265.6
(58) Field of Search ................................ 361/683, 684, 361/695, 724–727, 752; 312/223.2, 350, 265.6, 330.1; 248/634, 635

(56) References Cited

U.S. PATENT DOCUMENTS

| | | | | |
|---|---|---|---|---|
| 4,076,353 A | * | 2/1978 | Barlow | 312/350 |
| 5,400,216 A | | 3/1995 | Tsai | 361/684 |
| 5,412,534 A | * | 5/1995 | Cutts et al. | 361/695 |
| 5,546,276 A | * | 8/1996 | Cutts et al. | 361/724 |
| 5,574,625 A | * | 11/1996 | Ohgami et al. | 361/684 |
| 5,642,259 A | | 6/1997 | Ma | 361/686 |
| 5,982,613 A | | 11/1999 | Sternglass et al. | 361/680 |
| 6,043,977 A | | 3/2000 | Nakajima | 361/687 |
| 6,111,747 A | * | 8/2000 | Jeffries et al. | 361/684 |
| 6,181,565 B1 | * | 1/2001 | Schmitt et al. | 361/756 |
| 6,377,451 B1 | * | 4/2002 | Furuya | 361/686 |
| 6,390,855 B1 | | 5/2002 | Chang | 439/638 |
| 6,392,892 B1 | * | 5/2002 | Sobolewski et al. | 361/724 |
| 6,445,578 B1 | * | 9/2002 | Bell et al. | 361/685 |
| 6,480,391 B1 | * | 11/2002 | Monson et al. | 361/752 |

* cited by examiner

*Primary Examiner*—Lisa Lea-Edmonds
(74) *Attorney, Agent, or Firm*—Baker Botts L.L.P.

(57) ABSTRACT

A cartridge receptacle receives a cartridge that features a computer adapter card. The cartridge receptacle includes a side with first and second card guides attached to that side. The first and second card guides are dimensioned to cooperate with retaining structure on an installed cartridge to retain the installed cartridge in the receptacle while providing a gap for air flow between the installed cartridge and the side. Various embodiments of the receptacle accept various sizes and numbers of expandable cartridges. Corresponding cartridges and information handling systems incorporating receptacles for expandable computer cartridges are also described.

14 Claims, 5 Drawing Sheets

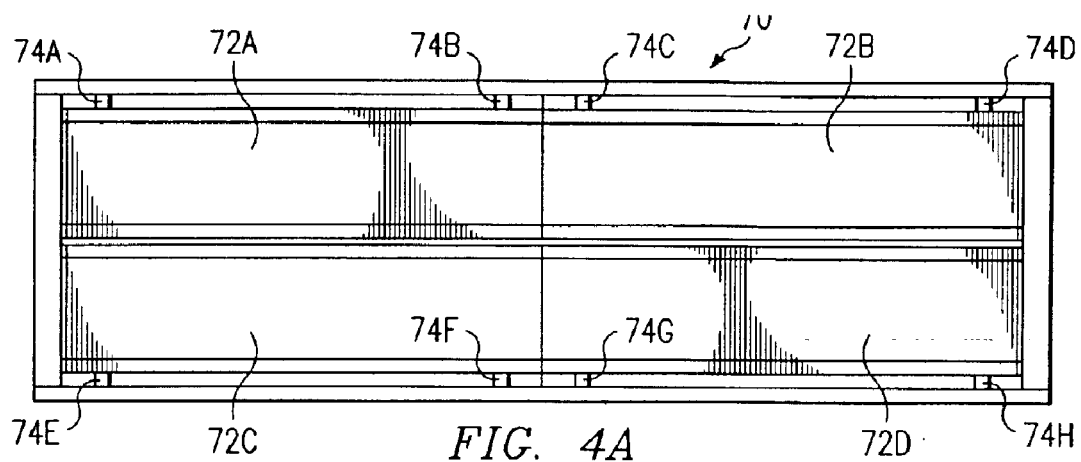
FIG. 4A
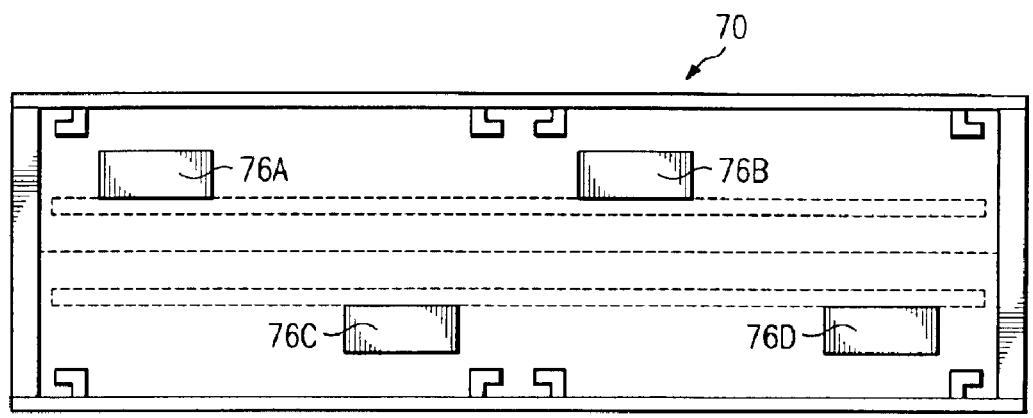
FIG. 4B
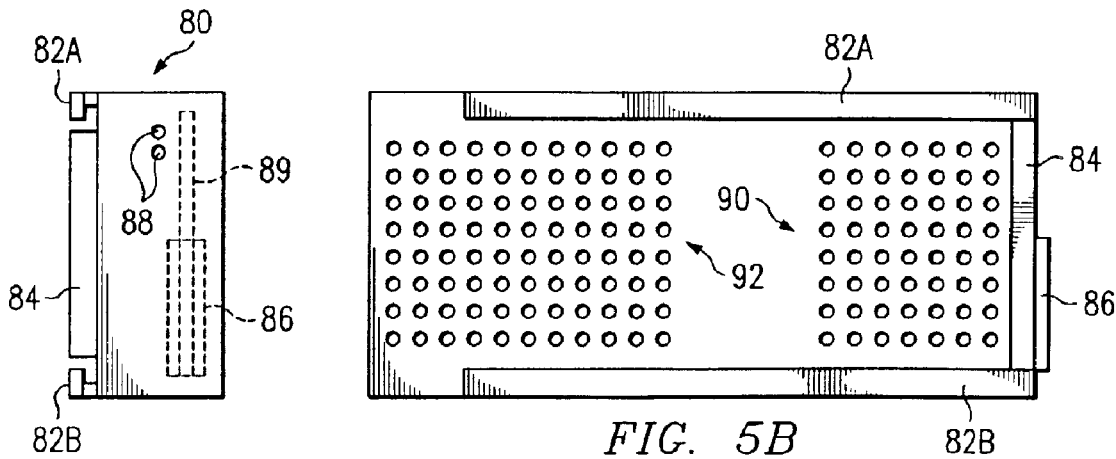
FIG. 5A
FIG. 5B
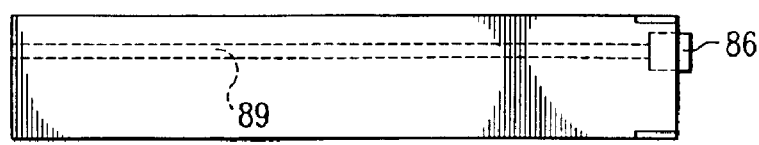
FIG. 5C

EXTENDABLE COMPUTER CARTRIDGE RECEPTACLE SYSTEM

TECHNICAL FIELD

This invention relates in general to information handling systems. In particular, this invention relates to an extendable computer cartridge receptacle system.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information. Information handling systems may also include one or more computer systems, data storage systems, and networking systems.

Many information handling systems, such as personal computers (PCs) for instance, provide for customization or expansion through the use of adapter cards. An adapter card is a hardware device that a user may connect to the main system to increase or modify the capabilities of the system. Adapter cards may also be referred to as interface cards, expansion cards, expansion boards, PC Cards, computer cartridges, etc.

Computer cartridges typically include one or more electronic components, an input/output (I/O) connector that plugs in to a communication bus in the system, and conductors that lead from the electronic components to the connector. The computer cartridge may include a printed circuit board (PCB) that contains the conductors, and the electronic components may be mounted to that PCB. A computer cartridge may also include protective structure, such as a housing or a base, to reduce the likelihood of damage from handling or mishandling the cartridge.

Many information handling systems include a slot or bay that allows the user to install a computer cartridge without removing the system case. For instance, a notebook computer sold by Dell Computer Corporation under the trademark LATITUDE may include a slot on the left side that accommodates PC Cards.

SUMMARY OF THE INVENTION

The invention relates to an extendable computer cartridge receptacle system. One aspect involves a receptacle that accepts an extendable computer cartridge. Another aspect involves a computer system that features such a receptacle. Another aspect involves the extendable computer cartridge.

An extendable computer cartridge according to one embodiment of the present invention features first and second rails attached to the same side of the cartridge. The first and second rails may be dimensioned to cooperate with retaining structures on a cartridge receptacle to retain the cartridge in the receptacle. Example receptacles for expandable computer cartridges according to the present invention may accept cartridges with various widths and/or heights, unlike conventional computer cartridge bays that only accept cartridges with a standard width.

BRIEF DESCRIPTION OF THE DRAWINGS

A more complete understanding of the present invention and advantages thereof may be acquired by referring to the appended claims, the following description of one or more example embodiments, and the accompanying drawings, in which:

FIG. 4A depicts a front view of an example two-by-two receptacle according to the present invention;

FIG. 4B depicts a front view of the receptacle of FIG. 4A with the doors removed;

FIG. 5A depicts a front view of an example single-wide computer cartridge according to the present invention;

FIG. 5B depicts a bottom view of the computer cartridge of FIG. 5A;

FIG. 5C depicts a side view of the computer cartridge of FIG. 5A;

DETAILED DESCRIPTION OF THE INVENTION

Figure 1A:
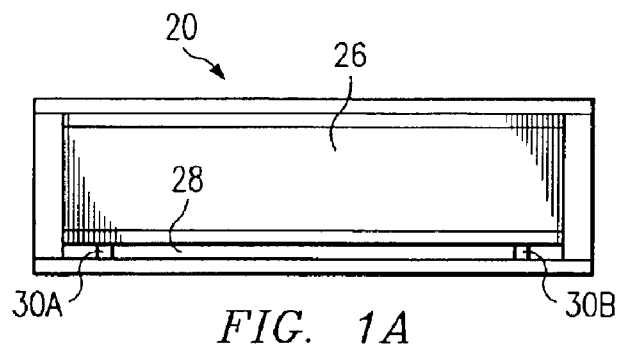
FIG. 1A depicts a front view of an example single-wide receptacle according to the present invention.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices, as well as various input and output (I/O) devices, such as a keyboard, a mouse, and a video display. The information handling system may also include one or more buses operable to transmit communications between the various hardware components. An information handling system may include a receptacle for an expandable computer cartridge according to the present invention.

As stated above, some conventional information handling systems include a receptacle for a computer cartridge. A typical conventional receptacle includes one slot or channel on one side of the receptacle and a second channel on the opposite side of the receptacle. These two channels receive opposite side edges of the computer cartridge, and the channels serve to guide the cartridge during cartridge insertion and to retain the cartridge in the receptacle.

A disadvantage of such an arrangement, however, is that the cartridges are limited to the standard width of the receptacle. For instance, a standard PC Card is 54 millimeters (mm) wide, 85 mm long, and either 3.3 or 5 mm high. Accordingly, the channels on a receptacle for a standard PC Card are 54 mm apart. Consequently, the area available in the PC Card for electronic components (i.e., the "real estate") is limited by the standard PC Card width. This limitation reduces the possible or practical applications for which PC Cards may be produced. For instance, there may not be enough real estate to effectively accommodate all of the electronic components required for a complicated subsystem assembly, such as a 3D video graphics adapter for example.

Also, many conventional computer cartridges do not dissipate heat well. This problem is exacerbated by the limited real estate available for arranging the components that generate the heat within the computer cartridge. This characteristic further limits the types of subsystems that can effectively be implemented in conventional computer cartridges. Information handling systems, receptacles, and cartridges according to the present invention may reduce or eliminate one or more of the disadvantages associated with conventional computer cartridges. Various example embodiments relating to the present invention are described in detail below.

Figure 1B:
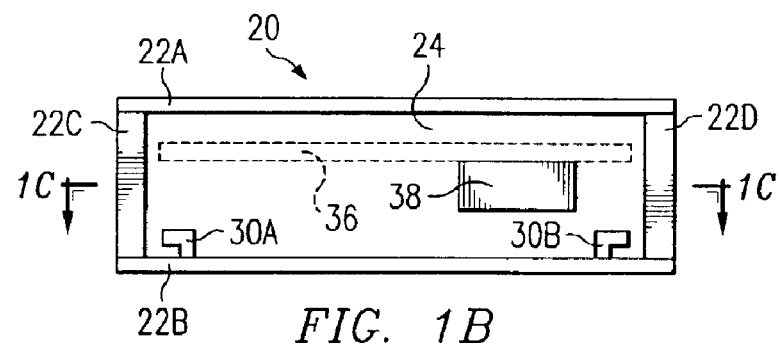
FIG. 1B depicts a front view of the receptacle of FIG. 1A with the door removed.
Figure 1C:
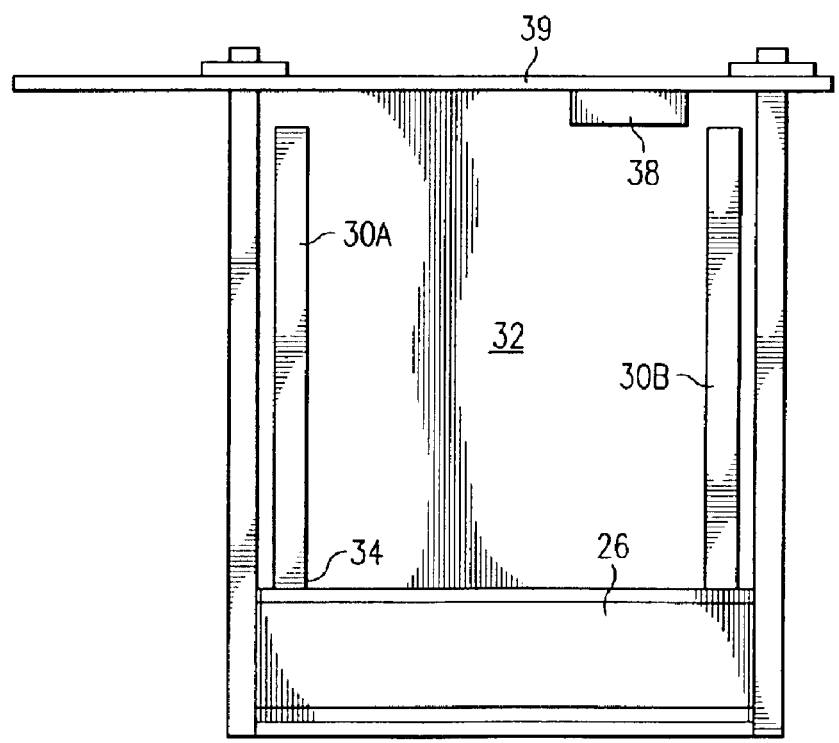
FIG. 1C depicts a top view cross section of the receptacle of FIG. 1A with the door in an open position.

FIG. 1A depicts a front view of one example embodiment of a computer cartridge receptacle 20 according to the present invention. FIG. 1B depicts a front view of receptacle 20 without the door 26, and FIG. 1C depicts a top view cross section of receptacle 20, taken along line 1C—1C from FIG. 1B. Receptacle 20 accepts a single-width, single-height expandable computer card, such as the cartridge depicted in FIGS. 5A through 5C. Such a cartridge may also be referred to as a single-wide card or cartridge, or simply as a 1W×1H card.

As described in greater detail below, alternative receptacles may accept cartridges larger than the 1W×1H card. Such cards may include cartridges with twice the width (2w×1H), twice the height (1W×2H), or both (2W×2H), and cards larger than twice as wide (e.g., 3W×1H, 3W×2H, 4W×1H, etc.), as well as cards with intermediates heights, widths, or both (e.g., 1.5W×1.5H). In general, the width measurements are expected to be greater than the height measurements. Accordingly, the top and bottom receptacle or cartridge sides may be referred to as long sides, and the left and right sides may be referred to as short sides.

As illustrated in FIGS. 1A–1C, receptacle 20 includes an exposed top edge 22A, an exposed bottom edge 22B, an exposed left side edge 22C, and an exposed right side edge 22D. Edges 22A–22D surround an opening 24, which may be partially covered by a spring loaded cover or door 26 that is biased towards the closed position. Opening 24 may be dimensioned to leave an air gap or passage 28 when door 26 is closed and when door 26 is open with a card installed. Air passage 28 may also be referred to as an air flow gap 28. Opening 24 may also be dimensioned to become totally sealed when door 26 is closed and when door 26 is open with a card installed. This configuration may be useful when other means for air flow have been provided and to prevent or inhibit electromagnetic waves from escaping the chassis.

Door 26 may be used to maintain generally uniform air exhaust flow whether or not a computer card is installed in receptacle 20. In alternative embodiments, doors may be omitted, thereby maximizing air flow when receptacles are unoccupied.

Bottom edge 22B may be the exposed part of a generally planar bottom side panel 32 for receptacle 20. Similarly, one or more of the other edges may be the exposed parts of respective receptacle side panels. Attached to bottom side panel 32 are a left rail 30A and a right rail 30B. Guide rails 30A and 30B are configured to receive corresponding structure on a computer cartridge according to the present invention, to guide the cartridge during insertion, so that an I/O connector on the cartridge properly meets an I/O connector 38 in the system, and to retain the cartridge in receptacle 20. Connector 38 may be mounted on a backplane or motherboard 39, which may form the back side of receptacle 20. Connector 38 may also be structurally mounted within a chassis structure and may be a connector at the end of a cable.

Guide rails 30A and 30B may also be referred to as card guides 30A and 30B. Card guides 30A and 30B, and similar parts of alternative embodiments, may also be referred to as retaining structure. In the example embodiment, card guides 30A and 30B each have a front edge 34 that is spaced back from opening 24, to provide room for door 26 to swing back into receptacle 20 away from opening 24 when a cartridge is inserted. In alternative embodiments of the present invention, the card guides in the receptacle and the corresponding structure on the cards may take on various different shapes and sizes according to standard engineering practice. Card guides 30A and 30B in FIGS. 1A–1C demonstrate one example out of many potential implementations.

As shown in FIG. 1B, when a card is installed, a printed circuit board (PCB) 36 in the card may be supported towards the top of receptacle 20, and some or all of the components mounted to PCB 36 may be located on the bottom of PCB 36. Consequently, as described below, air flow through the bottom side of the card may effectively remove heat from those components.

Figure 2A:
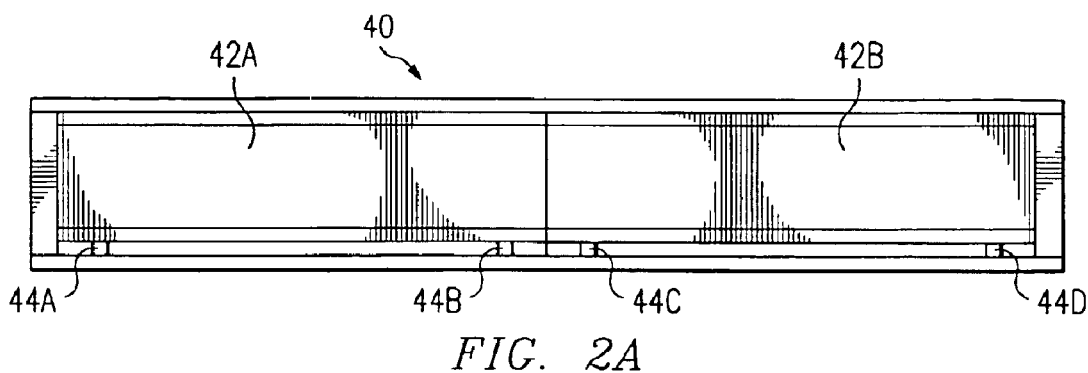
FIG. 2A depicts a front view of an example double-wide receptacle according to the present invention.
Figure 2B:
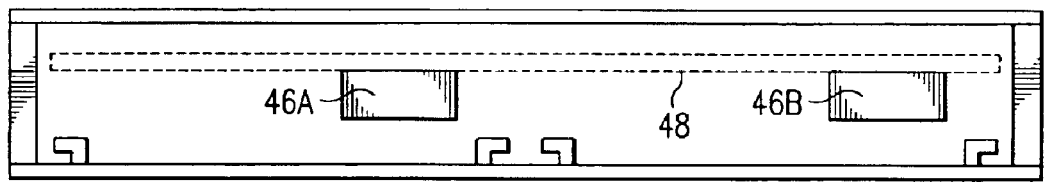
FIG. 2B depicts a front view of the receptacle of FIG. 2A with the doors removed.

FIGS. 2A and 2B depict front views of an example embodiment of a double-wide receptacle 40 according to the present invention. FIG. 2A includes doors 42A and 42B, and FIG. 2B does not. As illustrated, receptacle 40 includes four guides 44A, 44B, 44C, and 44D on the bottom side of receptacle 40. Consequently, receptacle 40 can accept one or two individual single-wide cartridges. In addition, double-wide receptacle 40 can accommodate a cartridge that is wider than a standard single-wide cartridge.

Figure 7:
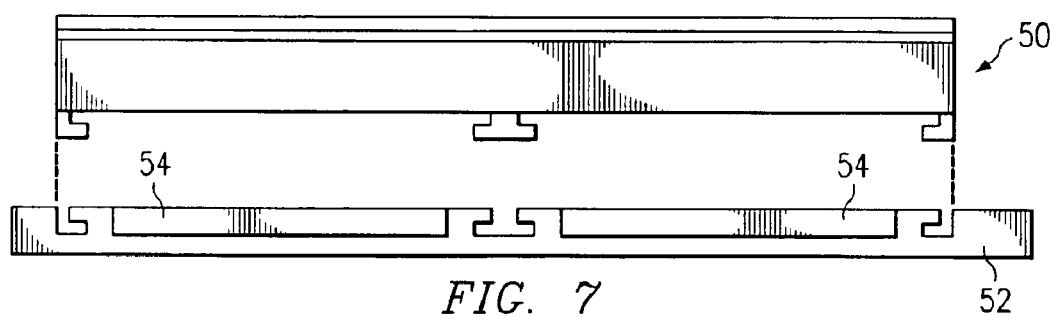
FIG. 7 depicts a front view of an example doublewide computer cartridge according to the present invention, as well as an example double-wide receptacle according to the present invention.

For instance, FIG. 7 depicts a front view of an example embodiment of a double-wide computer cartridge 50 according to the present invention. In addition, FIG. 7 depicts the bottom side 52 of an example embodiment of a double-wide receptacle according to the present invention. As illustrated, since the card guides or slots for each cartridge are not on opposite sides of the receptacle, but are instead provided on the bottom or top side of the receptacle, the cartridge is not limited to the width of a single-wide receptacle. Computer cartridges according to the teachings of the present disclosure may therefore be referred to as expandable cartridges or extendable cartridges. As described in greater detail below with reference to FIG. 11, the receptacle may include an air flow baffle 54 mounted between each pair of card guides for purposes of thermal venting.

Referring again to FIGS. 2A and 2B, since cartridges are not limited to the width of a single-wide receptacle, the real estate available for arranging components within a cartridge is substantially increased. For instance, a cartridge for receptacle 40 may include a PCB 48 that is up to approximately twice as wide as a PCB for a single-wide cartridge. In addition, such a cartridge may include one connector if sufficient, or two connectors if necessary to mate with connectors 46A and 46B in receptacle 40, for instance to obtain more power or bandwidth from and possibly communicate additional signals with the main system. The additional size of the cartridge enables greater heat dissipation. Effectively, twice the volume may provide sufficient thermal dissipation to allow twice the power to the circuitry on PCB 48.

Figure 3A:
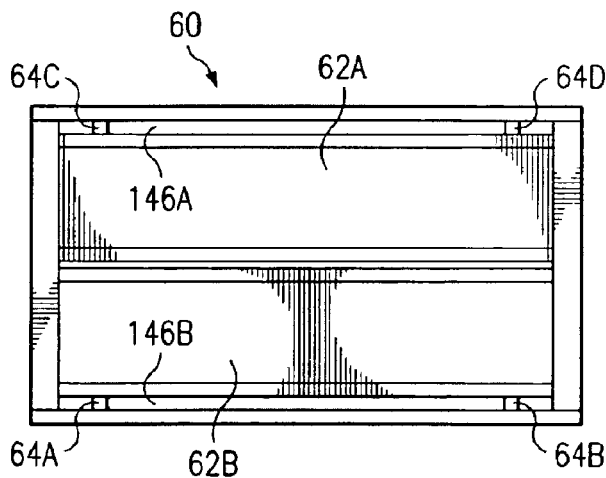
FIG. 3A depicts a front view of an example double-high receptacle according to the present invention.

FIGS. 3A and 3D depict front views of an example embodiment of a double-high receptacle 60 according to the present invention. FIG. 3A includes doors 62A and 62B, and FIG. 3B does not. As illustrated, receptacle 60 includes a bottom side with two card guides 64A and 64B and a top side with two card guides 64C and 64D. Consequently, receptacle 60 can accept one or two individual single-wide cartridges. In addition, double-high receptacle 40 can receive a cartridge that is taller than a standard single-wide cartridge. Such extra tall cartridges may also be referred to as expandable cartridges or extendable cartridges. Furthermore, such a cartridge may include one or two I/0 connectors to mate with connector 66A, connector 66B, or both. A 1 W×2H cartridge, for instance, may include rails on the top side, on the bottom side, or on both of those sides, as desired. Extra-height cartridges may be used to provide more space for daughter cards or other components within the cartridge or for enhanced thermal dissipation, for example.

FIGS. 4A and 4B depict front views of an example embodiment of a 2W×2H or two-by-two receptacle 70 according to the present invention. FIG. 4A includes doors 72A, 72B, 72C, and 72D, while FIG. 4B does not include doors. In addition, receptacle 70 includes four card guides 74A, 74B, 74C, and 74D on the top side, as well as four card guides 74E, 74F, 74G, and 74H on the bottom side. Receptacle 70 further includes four connectors 76A, 76B, 76C and 76D. Thus, as will be readily apparent, many different combinations of cartridges may be installed in receptacle 70, including from one to four standard single-wide cartridges. Alternatively, one or two double-wide or double-high cartridges may be installed. Alternatively, a user could install one double-wide, double-high (2W×2H) cartridge with from one to four connectors and from two to eight rails. Such a cartridge may include multiple connectors and multiple interconnected PCBs, for instance. Such a cartridge may therefore provide abundant real estate for providing and arranging components, as well as abundant power and signaling capabilities, for very sophisticated and demanding subsystems.

FIG. 5A depicts a front view of an example embodiment of a single-wide (1W×1H) computer cartridge 80 according to the present invention. Attached to the bottom of computer cartridge 80 are a left rail 82A and a right rail 82B. Rails 82A and 82B are dimensioned to slidably engage retaining structure in a cartridge receptacle (e.g., card guides 74A and 74B or card guides 74C and 74D, etc., in receptacle 70). A backplate 84 may be provided on the back side of computer cartridge 80. Backplate 84 may help guide and support computer cartridge 80, particularly at the beginning of the insertion process for initial rail engagement, and towards the end of the insertion process to properly align connector 86 to engage a corresponding connector in the receptacle.

The front side of cartridge 80 may include one or more visual indicators or lights 88, such as an amber and a green LED, for instance. Lights 88 may be used to display status information for computer cartridge 80. For instance, flashing green may indicate an initialization status, solid green may indicate operational status, solid amber may indicate failure, and flashing amber may indicate that cartridge 80 is ready for removal. Cartridge 80 may also include a PCB 89 mounted towards the top side of cartridge 80.

FIG. 5B depicts a bottom view of computer cartridge 80. A rear portion of the bottom side of computer cartridge 80 may contain an ingress vent 90 for receiving air into computer cartridge 80, and a front portion of the bottom side may contain an egress vent 92 for discharging air from computer cartridge 80. In computer cartridge 80, a circular hole grid pattern is used for ingress vent 90 and egress vent 92, but other hole geometries could be used as well. As described in greater detail below, these cooling vents may cooperate with the structure within a computer system to provide for forced air flow through computer cartridge 80.

FIG. 5C depicts a side view of computer cartridge 80. Connector 86 may be attached to conductors in PCB 89, and connector 86 may be accessible or extend from the back side of computer cartridge 80, to connect to corresponding structure in a cartridge receptacle.

In the example embodiment, computer card 80 may be 14 mm high (including rails 82A and 82B), 75 mm wide, and 130 mm long. The hole grid for ingress vent 90 may extend 40 mm from the back side, and hole grid for egress vent 99 may extend 55 mm from the front side. The top of PCB 89 may be 4 mm from the top surface of the top side of card 80. Rails 82A and 82B and backplate 84 may extend down 4 mm from the bottom side. Rails 82A and 82B may each include a vertical portion that is 2 mm thick and that extends down 4 mm, as well as a horizontal portion or tab that is 2 mm thick and that extends in from the side towards backplate 84 for 4 mm. The gap between backplate 84 and each of rails 82A and 82B may be 2 mm. Graphics such as labels may be applied to the top side or other sides of card 80.

Figure 6:
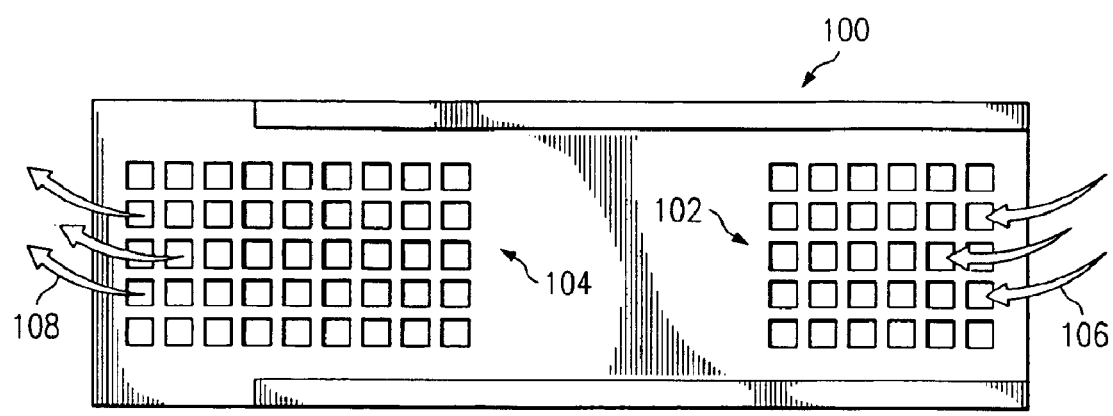
FIG. 6 depicts a bottom view of another example single-wide computer cartridge according to the present invention.

FIG. 6 depicts a bottom view of another example embodiment of a single-wide computer cartridge 100 according to the present invention. As shown, a square hole grid pattern is used for ingress vent 102 and egress vent 104 in computer cartridge 100. Each hole may be 4 mm square, for example.

As represented by block arrow 106 and described in greater detail below, the system may be designed to force relatively cool air into ingress vent 102 to absorb heat from components within computer cartridge 100. The system design may then allow that warmer air to pass through egress vent 104 and exit the system, as depicted by block arrow 108. Also, in the embodiment illustrated in FIG. 6, computer cartridge 100 does not use a backplate.

Figure 8:
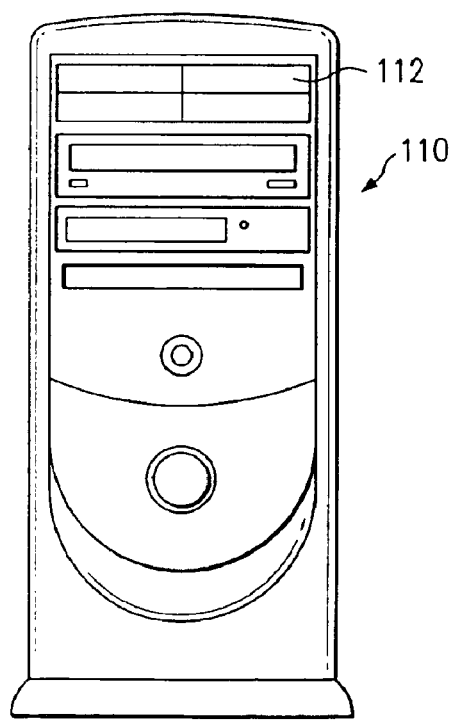
FIG. 8 depicts a front view of an example information handling system featuring a two-by-two receptacle according to the present invention.

FIG. 8 depicts a front view of an example embodiment of an information handling system 110 featuring a two-by-two or 2W×2H receptacle 112 according to the present invention. Receptacle 112 may occupy a standard 5.25 inch bay and may be easily accessible to users from the front of information handling system 110. Receptacle sizes may be larger or smaller than that shown in receptacle 112 and may be designed into an information handling system in a horizontal position as shown or a vertical position.

Figure 9:
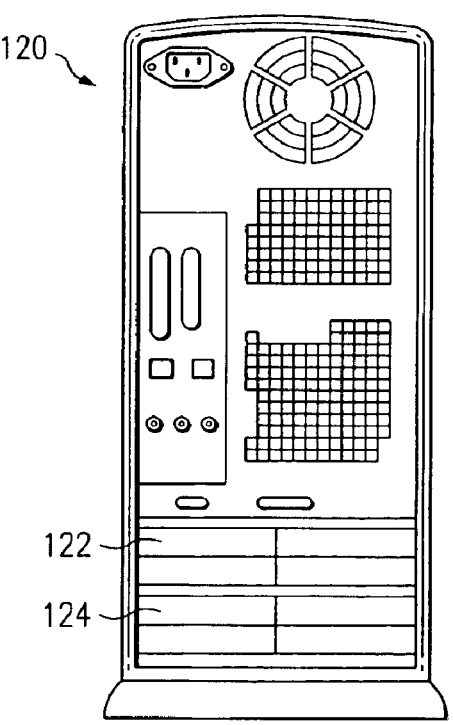
FIG. 9 depicts a rear view of an example information handling system featuring two two-by-two receptacles according to the present invention.

FIG. 9 depicts a rear view of an example embodiment of an information handling system 120 featuring two 2W×2H receptacles 122 and 124 for extendable computer cartridges. Receptacles 122 and 124 may be used in addition to or in place of slots and connectors for conventional adapter cards such as PCI cards. Using receptacles 122 and 124, a user may simply insert or remove one or more expandable adapter cards to modify the capabilities of information handling system 120 without removing the system case or cover. As in FIG. 8, the embodiment shown in FIG. 9 may be of various sizes, smaller or larger than those shown at 122 and 124. The implementation shown is in a horizontal position, but receptacles may also be implemented in a vertical design.

Figure 10:
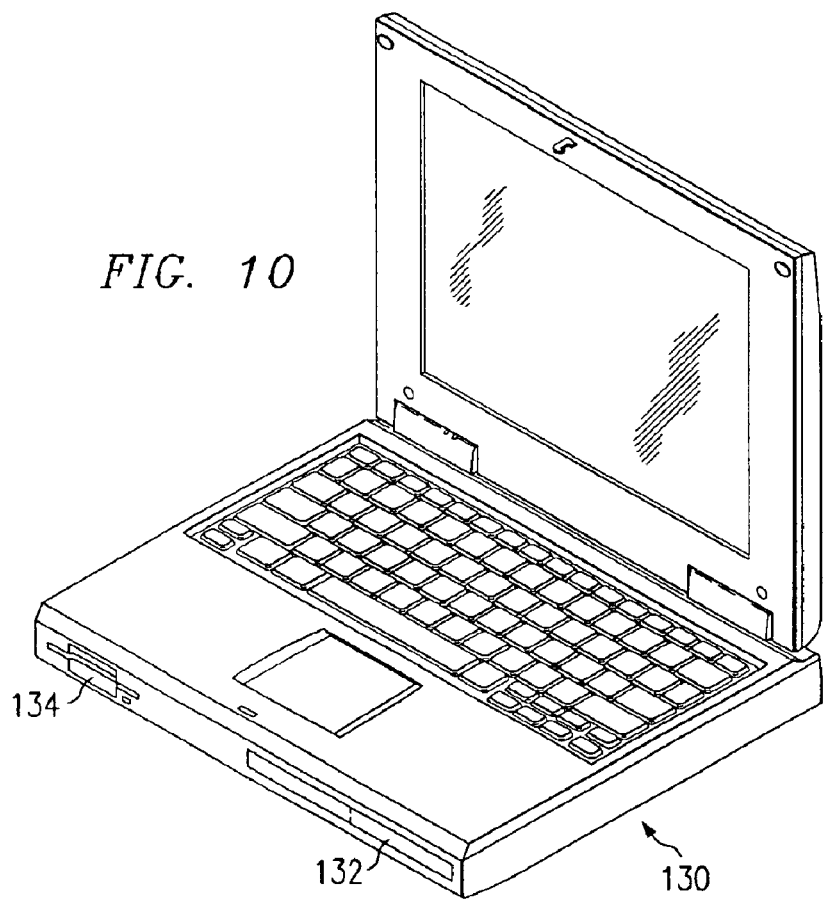
FIG. 10 depicts a perspective view of another example information handling system featuring a two-by-one receptacle according to the present invention.

FIG. 10 depicts a perspective view of another example embodiment of an information handling system 130 featuring a double-wide receptacle 132 according to the present invention. For instance, a notebook computer may include one drive bay 134 occupying half of the front panel and one 2W×1H receptacle 132 occupying the other half of the front panel. In alternative embodiments, receptacles for expandable cartridges may be provided in other parts of information handling systems (e.g., in top, left, or right side panels of a system case).

Figure 3B:
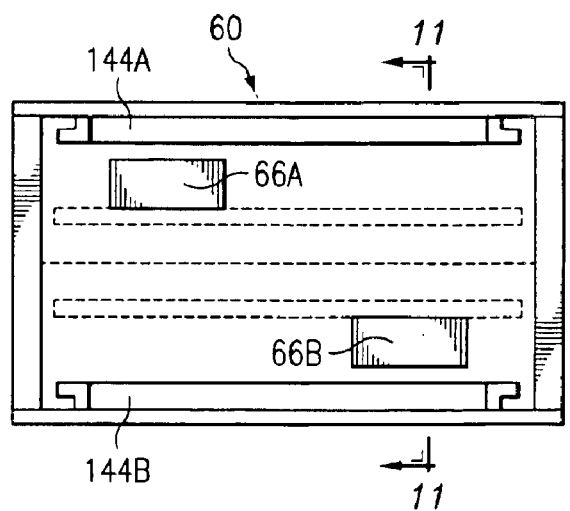
FIG. 3B depicts a front view of the receptacle of FIG. 3A with the doors removed.
Figure 11:
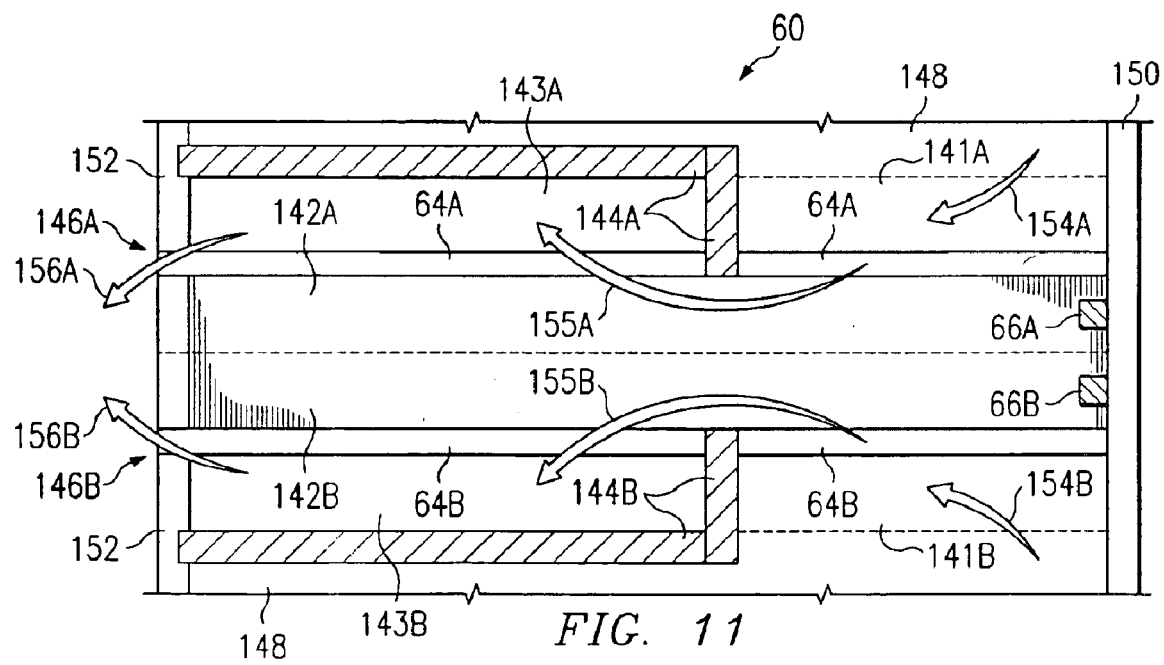
FIG. 11 depicts a side view cross section, with portions broken away, of the receptacle and surrounding area in the information handling system of FIG. 3B.

FIG. 11 depicts a side view cross section, taken along line 11—11, with portions broken away, of receptacle 60 and the surrounding area from FIG. 3B. In FIG. 11, card guides 64A and 64C are visible, as are the external chassis wall 152 and a motherboard or backplane 150 within the information handling system. Receptacle 60 includes a top bay or slot 142A and a bottom bay or slot 142B for receiving one or two 1W×1H cartridges or one double-high cartridge. Slot 142A terminates with an air gap 146A in chassis wall 152 above slot 142A, and slot 142B terminates with an air gap 146B in chassis wall 152 below slot 142B. Similar air gaps are shown from a different angle at reference numbers 146A and 146B in FIG. 3A. When cartridges are installed in slots 142A and 142B, the mounting rails on the cartridges and card guides in receptacle 60 may cooperate to keep the cartridges suspended above air gaps 146A and 146B, to provide for thermal venting.

Baffle 144A is mounted between an inlet area 141A for pressurized air from system space 148 and an outlet area 143A, in a manner similar to that illustrated from a different angle in FIG. 7. Likewise, baffle 144B is mounted between an inlet area 141B for pressurized air from system space 148 and an outlet area 143A. Inlet areas 141A and 141B may also be referred to as inlet air plenums, chambers, or compartments. Likewise, outlet areas 143A and 143B may also be referred to as outlet air plenums, chambers, or compartments.

The surrounding system is designed to force air under pressure from system space 148 into inlet areas 141A and 141B behind baffles 144A and 144B, as illustrated by block arrows 154A and 154B. When cartridges are installed in slots 142A and 142B, baffles 144A and 144B cause the pressurized air to flow into ingress vents in the cartridges. The air then absorbs heat from components while flowing through the cartridges, as illustrated by block arrows 155A and 155B, and exits the cartridges through the egress vents into outlet air plenums 143A and 143B in front of baffles 144A and 144B. The warm air then exits the system through air gaps 146A and 146B, as illustrated by block arrows 156A and 156B. Air gaps 146A and 146B thus serve as vents above and below slots 142A and 142B from the front air plenums 143A and 143B to the exterior of the system. The front and rear air plenums may be from ⅛ to ¼ inches tall, for example.

Receptacle 60 is dimensioned to accept cartridges without backplates. In alternative embodiments, the receptacle baffles do not extend to the tops of the card guides or the baffles and/or backplates may flex to allow cartridges with backplates, such as computer cartridge 80 in FIG. 5A, to be fully inserted.

Although the present invention has been described with reference to various example embodiments, those with ordinary skill in the art will understand that numerous variations of those embodiments could be practiced without departing from the scope and spirit of the present invention. The scope of the invention is therefore not limited to the particulars of the embodiments or implementations illustrated herein, but is defined by the appended claims.

What is claimed:

1. A cartridge receptacle for receiving a cartridge that features a computer adapter card, the cartridge receptacle comprising: a plurality of walls defining sides of the receptacle; first and second card guides attached to a first side of the receptacle; the first and second card guides-dimensioned to cooperate with first and second retaining structures on a first side of an installed cartridge to retain the installed cartridge in the receptacle while providing a gap for air flow between the installed cartridge and the first side, the installed cartridge including electronic components extending into the gap, wherein the gap allows the air flow to remove heat from the electronic components; and an air flow baffle positioned in the gap between the first side of the receptacle and the installed cartridge, and interposed between a first inlet area that receives pressurized system air and a first outlet area for thermal venting.

2. A cartridge receptacle as recited in claim 1, wherein: the first side of the receptacle composes a first long side; and the cartridge receptacle further comprises a second long side positioned opposite the first long side and first and second short sides connecting the first and second long sides, the receptacle dimensioned to receive one or more installed cartridges.

3. A cartridge receptacle as recited in claim 2, further comprising a spring-loaded door operable to close upon removal of the installed cartridge.

4. A cartridge receptacle as recited in claim 2, further comprising: third and fourth card guides attached to the second long side; the third and fourth card guides dimensioned to cooperate with an additional retaining structure on a second side of the installed cartridge to retain the installed cartridge in the receptacle while providing a second gap for air flow between the installed cartridge and the second long side.

5. A cartridge receptacle as recited in claim 4, further comprising an air flow baffle positioned on the second long side interposed between the third and fourth card guides.

6. A cartridge receptacle as recited in claim 2, further comprising: third and fourth card guides attached to the first long side; fifth, sixth, seventh and eighth card guides attached to the second long side; the third, fourth, fifth, sixth, seventh and eighth card guides dimensioned to cooperate with plural retaining structures on respective sides of multiple installed cartridges to retain the multiple installed cartridges in the receptacle while providing gaps for air flow between the installed cartridges and the first and second long sides.

7. A cartridge receptacle as recited in claim 6, further comprising: an air flow baffle positioned on the first long side interposed between a first inlet area that receives pressurized system air and a first outlet area for thermal venting; and an air flow baffle positioned on the second long side interposed between a second inlet area that receives pressurized system air and a second outlet area for thermal venting.

8. A cartridge receptacle as recited in claim 1, further comprising: a receptacle opening at a first end of the receptacle; and a first input/output (I/O) connector positioned on a second end of the receptacle opposite the receptacle opening, the first I/O connector operable to mate with a second I/O connector on the installed cartridge.

9. A cartridge receptacle as recited in claim 1, further comprising an air flow baffle positioned on the side interposed between the first and second card guides.

10. A cartridge receptacle as recited in claim 9, wherein the air flow baffle is also interposed between an inlet area that receives pressurized system air and an outlet area for thermal venting.

11. A cartridge receptacle as recited in claim 1, further comprising third and fourth card guides attached to the first side, whereby the cartridge receptacle can interchangeably accept one or more single-width cartridges and an extra-wide cartridge.

12. An information handling system comprising: a cartridge receptacle that receives a cartridge featuring a computer adapter card, the cartridge receptacle comprising: a plurality of walls defining sides of the receptacle; first and second card guides attached to a first side of the receptacle; the first and second card guides-dimensioned to cooperate with first and second retaining structures on a first side of an installed cartridge to retain the installed cartridge in the receptacle while providing a gap for air flow between the installed cartridge and the first side of the receptacle, the installed cartridge including electronic components extending into the gap, wherein the gap allows the air flow to remove heat from the electronic components; and an air flow baffle positioned in the gap between the first side of the receptacle and the installed cartridge, and interposed between a first inlet area that receives pressurized system air and a first outlet area for thermal venting.

13. The information handling system of claim 12, further comprising third and fourth card guides attached to the first side of the receptacle, whereby the cartridge receptacle can interchangeably accept one or more single-width cartridges and one or more extra-wide cartridges.

14. The information handling system of claim 12, wherein: the first side comprises a first long side; and the cartridge receptacle further comprises a second long side positioned opposite the first long side and first and second short sides connecting the first and second long sides, the receptacle dimensioned to receive one or more installed cartridges.

* * * * *